US 8,810,945 B2

(12) United States Patent
Makino

(10) Patent No.: US 8,810,945 B2
(45) Date of Patent: Aug. 19, 2014

(54) VIBRATION DETECTION AND CONTROL OF STORAGE DEVICE AND STORAGE SYSTEM

(75) Inventor: Tomoya Makino, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 162 days.

(21) Appl. No.: 13/358,032

(22) Filed: Jan. 25, 2012

(65) Prior Publication Data

US 2012/0243116 A1  Sep. 27, 2012

(30) Foreign Application Priority Data

Mar. 26, 2011  (JP) ................................. 2011-069026

(51) Int. Cl.
G11B 33/08  (2006.01)

(52) U.S. Cl.
USPC .......................................... 360/55; 360/97.19

(58) Field of Classification Search
None
See application file for complete search history.

(56) References Cited

U.S. PATENT DOCUMENTS

| 6,961,207 | B2* | 11/2005 | Kang et al. | 360/97.19 |
| 7,564,641 | B2* | 7/2009 | Kamimura et al. | 360/75 |
| 8,139,467 | B2* | 3/2012 | Gross et al. | 369/247.1 |
| 2002/0053046 | A1* | 5/2002 | Gray et al. | 714/42 |
| 2003/0223144 | A1* | 12/2003 | Smith et al. | 360/69 |
| 2009/0195922 | A1* | 8/2009 | Urmanov et al. | 360/97.02 |

FOREIGN PATENT DOCUMENTS

| JP | 2-134793 | 5/1990 |
| JP | 2003-228956 | 8/2003 |

* cited by examiner

Primary Examiner — Wayne Young
Assistant Examiner — Mark Fischer
(74) Attorney, Agent, or Firm — Staas & Halsey LLP

(57) ABSTRACT

A storage device includes a processor, a vibration detecting sensor that detects a vibration, a plurality of disk drives, and a disk control device that causes the processor to perform an operation of generating a vibration for a disk drive selected from among the plurality of disk drives so that the generated vibration vibrates in a cycle that is shorter than a cycle of the vibration detected by the vibration detecting sensor.

10 Claims, 13 Drawing Sheets

FIG. 8

| TIME | | 0:10:00 | | | | 0:10:10 | | | | 0:10:15 | | | | 0:10:20 | | | | 0:10:25 | | | | ... |
|---|---|---|---|---|---|---|---|---|---|---|---|---|---|---|---|---|---|---|---|---|---|---|
| ACCESS STATUS | DE NO. | DE #01 | | | | DE #01 | | | | DE #01 | | | | DE #01 | | | | DE #01 | | | | ... |
| | SLOT NO. | SLOT 8 | | | | SLOT 9 | | | | SLOT 7 | | | | SLOT 7 | | | | SLOT 8 | | | | ... |
| | ACCESS | READ | | | | READ | | | | READ | | | | READ | | | | WRITE | | | | ... |
| STATE OF VIBRATION | SENSOR | LEFT SIDE | UPPER SIDE | RIGHT SIDE | | LEFT SIDE | UPPER SIDE | RIGHT SIDE | | LEFT SIDE | UPPER SIDE | RIGHT SIDE | | LEFT SIDE | UPPER SIDE | RIGHT SIDE | | LEFT SIDE | UPPER SIDE | RIGHT SIDE | | ... |
| | VALUE OF VIBRATION | 0.1 | 0.1 | 0.2 | | -0.1 | 0.3 | 0.2 | | 0.2 | 0.1 | 0.3 | | 0.1 | -0.1 | 0.3 | | 0.1 | 0.2 | 0.3 | | ... |
| ACCESS STATUS | DE NO. | DE #02 | | | | DE #02 | | | | DE #02 | | | | DE #02 | | | | DE #02 | | | | ... |
| | SLOT NO. | SLOT 5 | | | | NO ACCESS | | | | NO ACCESS | | | | NO ACCESS | | | | NO ACCESS | | | | ... |
| | ACCESS | WRITE | | | | NO ACCESS | | | | NO ACCESS | | | | NO ACCESS | | | | NO ACCESS | | | | ... |
| STATE OF VIBRATION | SENSOR | LEFT SIDE | UPPER SIDE | RIGHT SIDE | | LEFT SIDE | UPPER SIDE | RIGHT SIDE | | LEFT SIDE | UPPER SIDE | RIGHT SIDE | | LEFT SIDE | UPPER SIDE | RIGHT SIDE | | LEFT SIDE | UPPER SIDE | RIGHT SIDE | | ... |
| | VALUE OF VIBRATION | -0.1 | 0.2 | 0 | | 0.3 | 0.3 | 0.2 | | 0.6 | 0.7 | 0.6 | | 0.7 | 0.5 | 0.6 | | 0.2 | 0.1 | 0.3 | | ... |
| ACCESS STATUS | DE NO. | DE #03 | | | | DE #03 | | | | DE #03 | | | | DE #03 | | | | DE #03 | | | | ... |
| | SLOT NO. | SLOT 1 | | | | NO ACCESS | | | | NO ACCESS | | | | NO ACCESS | | | | NO ACCESS | | | | ... |
| | ACCESS | WRITE | | | | NO ACCESS | | | | NO ACCESS | | | | NO ACCESS | | | | NO ACCESS | | | | ... |
| STATE OF VIBRATION | SENSOR | LEFT SIDE | UPPER SIDE | RIGHT SIDE | | LEFT SIDE | UPPER SIDE | RIGHT SIDE | | LEFT SIDE | UPPER SIDE | RIGHT SIDE | | LEFT SIDE | UPPER SIDE | RIGHT SIDE | | LEFT SIDE | UPPER SIDE | RIGHT SIDE | | ... |
| | VALUE OF VIBRATION | 0.1 | 0.3 | -0.2 | | 0.2 | -0.1 | 0.4 | | -0.3 | 0.2 | 0.2 | | 0.3 | 0.4 | 0.2 | | 0.3 | -0.2 | 0.1 | | ... |

THERE IS CORRELATION

75

| TYPE OF DRIVE | NUMBER OF POINTS |
|---|---|
| 15000 rpm | 1 |
| 10000 rpm | 0.7 |
| 7200 rpm | 0.5 |
| SSD | 0 |

| TYPE OF DRIVE | | 15000 rpm | 10000 rpm | 7200 rpm | SSD | TOTAL |
|---|---|---|---|---|---|---|
| DE #02 | NUMBER OF TIMES OF ACCESS | 0 | 0 | 2 | 3 | 5 |
| | NUMBER OF POINTS | 0 | 0 | 1 | 0 | 1 |
| DE #02 | NUMBER OF TIMES OF ACCESS | 3 | 0 | 0 | 0 | 3 |
| | NUMBER OF POINTS | 3 | 0 | 0 | 0 | 3 |

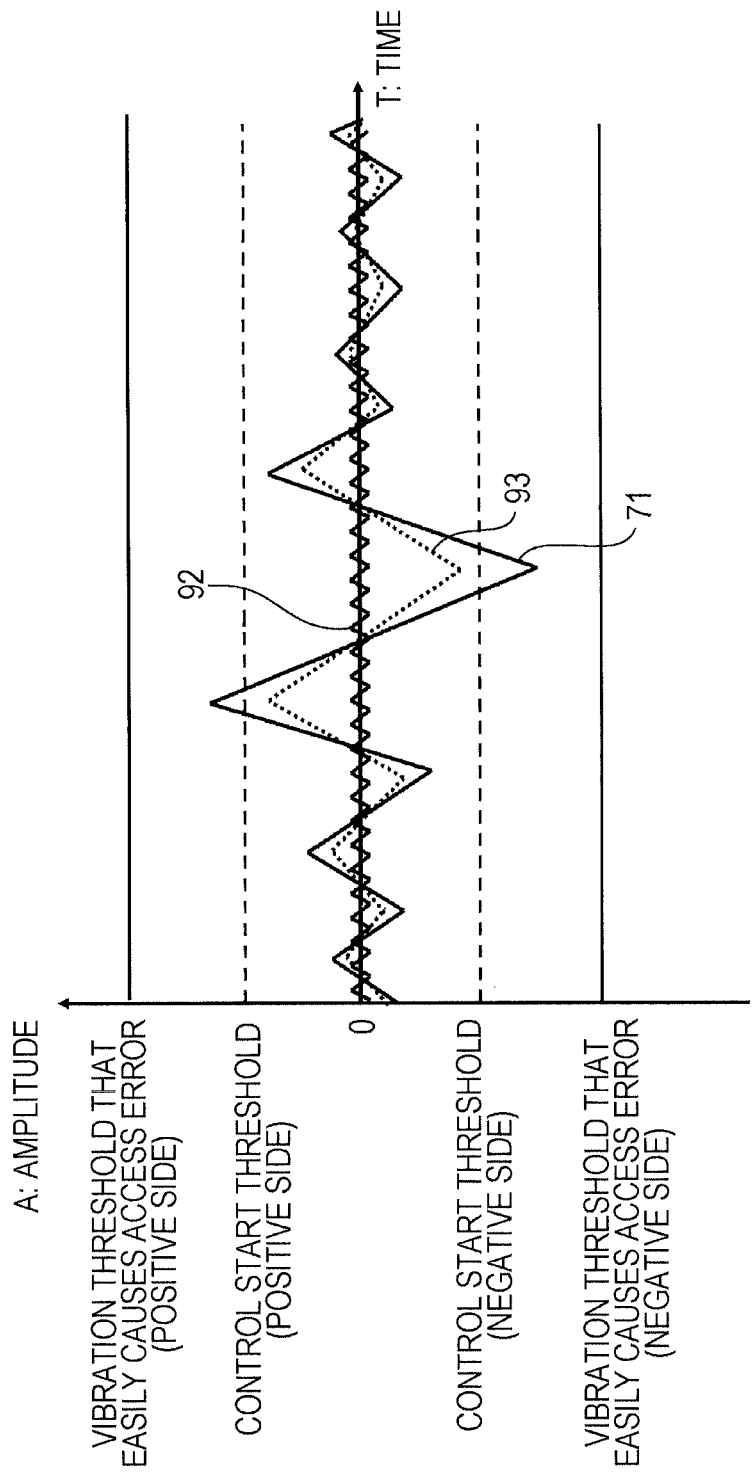

FIG. 13

| CYCLE OF VIBRATION | SEEKING ANGLE |
|---|---|
| LONG CYCLE | FULL SEEK OPERATION |
| MEDIUM CYCLE | HALF CYCLE |
| SHORT CYCLE | ONE-FOURTH OF CYCLE |

VIBRATION DETECTION AND CONTROL OF STORAGE DEVICE AND STORAGE SYSTEM

CROSS-REFERENCE TO RELATED APPLICATION(S)

This application is based upon and claims the benefit of priority of the prior Japanese Patent Application No. 2011-069026, filed on Mar. 26, 2011, the entire contents of which are incorporated herein by reference.

FIELD

The embodiments discussed herein are related to a storage device that includes a plurality of disk drives and a storage system that includes a plurality of storage devices.

BACKGROUND

A storage device (drive enclosure (DE)) that includes a plurality of hard disk drives (HDDs) and a disk control device that controls the HDDs is known. In addition, a Redundant Arrays of Inexpensive Disks (RAID) device that includes a plurality of storage devices is known.

The HDDs are storage medium driving devices that each have a structure in which a plurality of storage media (called platters) that are formed by coating or evaporating a magnetic material on metal are stacked at regular intervals. The HDDs each read and write data from and in the platters by causing a spindle motor (SPM) to rotate the stacked platters at a high speed and causing heads to be placed close to the platters.

The heads are located at ends of head arms. The heads are moved to inner and outer sides of the platters by a voice coil motor (VCM) and thereby positioned above target tracks of the platters.

The HDDs each include the spindle motor (SPM) and the voice coil motor (VCM). Thus, a vibration occurs in each of the HDDs owing to driving of the motors. The DE that includes the plurality of HDDs receives vibrations of the HDDs and generates a large vibration.

A storage system includes a plurality of DEs located on storage shelves included in a chassis. Vibrations that are generated by the DEs are transferred to the storage shelves so that a resonance occurs between the DEs in some cases. When the vibrations and the resonance are transferred to the DEs, the heads that are included in the HDDs included in the DEs vibrate. Thus, the heads are not appropriately positioned above target positions of the platters in some cases, and an access error may occur during reading of data or during writing of data.

In recent years, there has been a demand for HDDs to have large capacities and read and write data at high speeds, such HDDs has been rapidly developed, and the structures of the HDDs have become complicated. In order to increase the capacity of an HDD, the number of platters included in the HDD is increased as an example. In addition, in order to read and write data at a high speed, the numbers of revolutions of the platters are increased and the seek speeds of the heads are increased as examples.

In addition, yaw angles of the heads vary depending on target tracks of the platters owing to the structure of the HDD. The heads are provided for the platters. The number of platters, the number of heads and installation positions of the heads vary depending on the type of the HDD. The HDD includes a plurality of structural elements and control-related elements. Thus, it is not easy to simulate a vibration that occurs during an operation of the HDD.

In addition, regarding a DE that includes a plurality of HDDs, the number of parameters that are related to a vibration increases in response to an increase in the number of the HDDs. Thus, it is very, difficult to simulate a vibration that occurs during access operations of the HDDs included in the DE.

Adjusting the thickness of a metal sheet of a chassis of the DE on the basis of an experimental rule or changing a material of a case for housing the HDDs in the DE on the basis of an experimental rule makes a vibration unlikely to occur in the DE.

Japanese Laid-open Patent Publications Nos. 2003-228956 and 2-134793 are technical documents that are related to the aforementioned techniques.

SUMMARY

According to an aspect of the invention, an apparatus includes a processor, a vibration detecting sensor that detects a vibration, a plurality of disk drives, and a disk control device that causes the processor to perform an operation of generating a vibration for a disk drive selected from among the plurality of disk drives so that the generated vibration vibrates in a cycle that is shorter than a cycle of the vibration detected by the vibration detecting sensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an operational state management table.

FIG. 12 illustrates a method for reducing a vibration.

FIG. 13 illustrates a method for changing an access pattern.

DESCRIPTION OF EMBODIMENTS

Figure 1A:
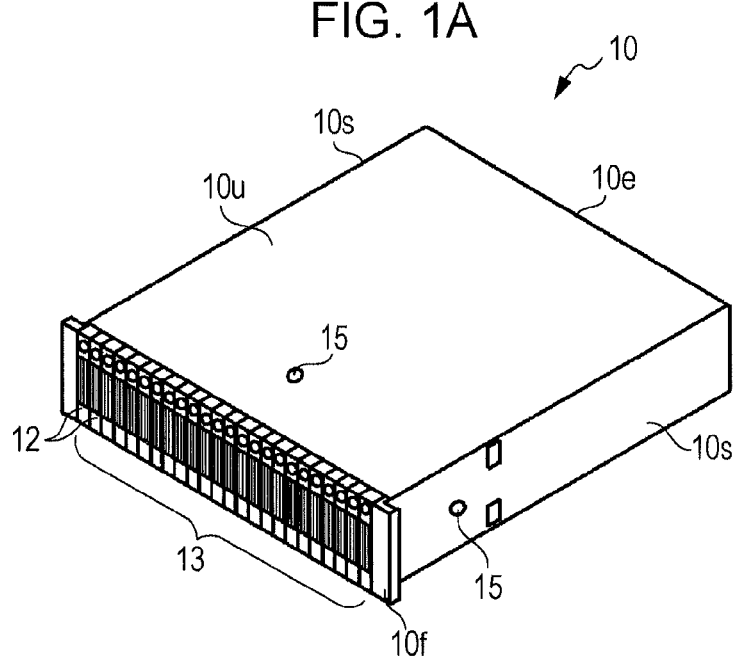
FIGS. 1A and 1B illustrate an appearance of a storage device and the inside of a chassis of the storage device.
Figure 1B:
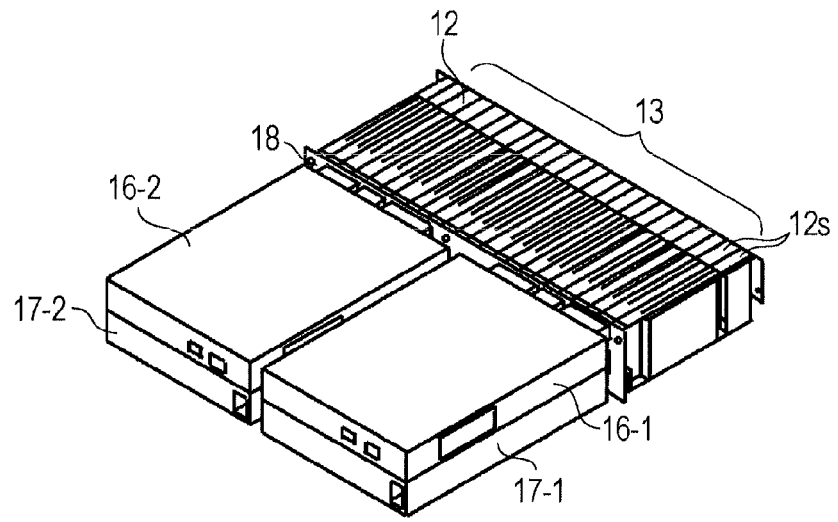

Embodiments are described in detail below with reference to the accompanying drawings. FIG. 1A illustrates an appearance of a storage device, while the FIG. 1B illustrates the inside of a chassis of the storage device. As illustrated in FIGS. 1A and 1B, the storage device 10 includes a chassis 10e. The storage device 10 includes a vibration detecting sensor 15 located on an upper surface 10u of the chassis 10e. In addition, the storage device 10 includes a vibration detecting sensor 15 located on a left side surface 10s of the chassis 10e and a vibration detecting sensor 15 located on a right side surface 10s of the chassis 10e.

As the vibration detecting sensors 15, acceleration sensors may be used. The acceleration sensors each extract the amount of a vibration as an electrical signal that is proportional to the acceleration of the vibration. As the acceleration sensors, single-axis sensors may be used. The single-axis sensors each detect a vibration caused by driving of a head or platter that is a source of the vibration. As the acceleration sensors, three-axis sensors that detect vibrations in x, y and z directions may be used.

As illustrated in FIG. 1A, a plurality of drives 12 are arranged in slots 13 of a front portion 10f of the chassis 10e. Drives 12s are spare drives. The drives 12 may be replaced with other drives by an operator. The drives 12 are installed in the storage device 10 by connecting connectors of a circuit board 18 arranged in the slots 13 to connectors of the drives 12.

As illustrated in FIG. 1B, two disk control devices 16-1 and 16-2 and two power supply devices 17-1 and 17-2 are arranged in the chassis, while the disk control devices 16-1 and 16-2 and the power supply devices 17-1 and 17-2 are connected to the circuit board 18.

The plurality of drives 12 are hard disk drives or solid state drives (SSDs). The SSDs are known as disk drives that are used instead of hard disk drives (HDDs). The SSDs each include a flash memory, for example. The drives 12 are arranged side by side and located adjacent to each other.

Figure 2:
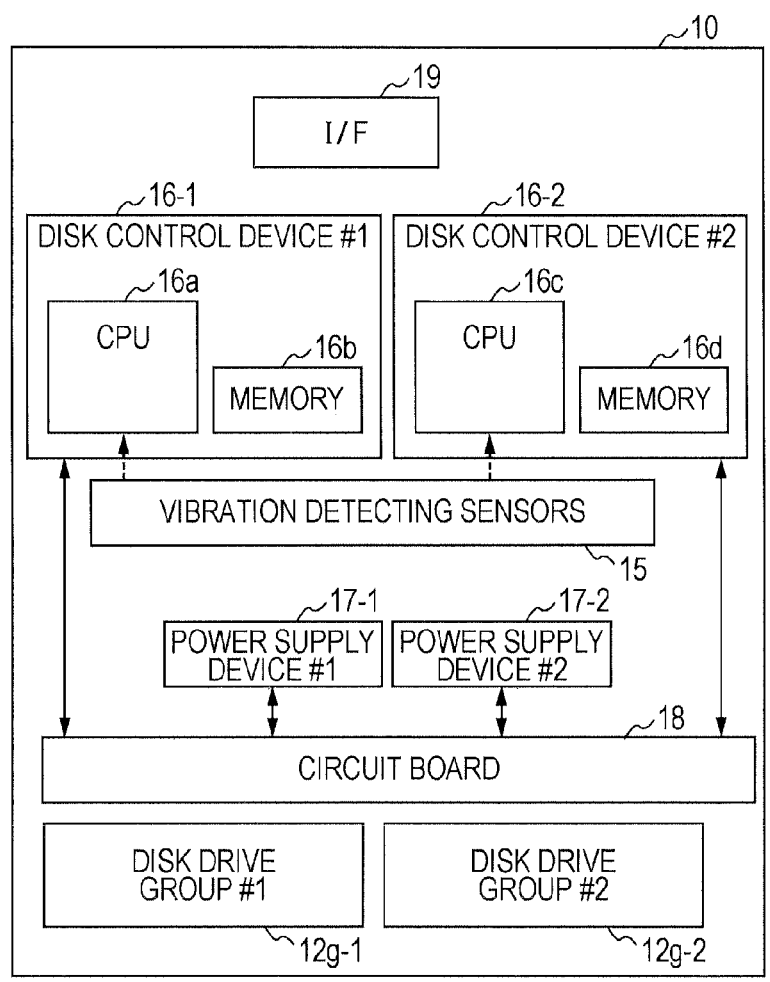
FIG. 2 illustrates an example of the storage device.

FIG. 2 illustrates an example of the storage device 10. The storage device 10 includes an interface (I/F) 19 and various circuits. The interface (I/F) 19 is connected to an external system, a storage control device and the like. The disk control device (#1) 16-1 includes a CPU 16a and a memory 16b. The disk control device (#2) 16-2 includes a CPU 16c and a memory 16d.

The memory 16b stores various programs that are used by the CPU 16a. The memory 16d stores various programs that are used by the CPU 16c. At least one of the memories 16b and 16d stores a vibration monitoring and control program that is used to monitor a vibration of the storage device 10 and perform vibration reduction control.

The plurality of drives 12 are divided into two RAID groups that are a disk drive group (#1) 12g-1 and a disk drive group (#2) 12g-2, for example. Drives 12 that are among the plurality of drives 12 and belong to the disk drive group (#1) 12g-1 are assigned to the disk control device 16-1 and the power supply device 17-1 and are under control of the disk control device 16-1. The other drives 12 that belong to the disk drive group (#2) 12g-2 are assigned to the disk control device 16-2 and the power supply device 17-2 and are under control of the disk control device 16-2.

The disk control device 16-1 controls a plurality of HDDs belonging to the disk drive group (#1) 12g-1 in response to various commands received by the disk control device 16-1 through the interface (I/F) 19. The disk control device 16-2 controls a plurality of HDDs belonging to the disk drive group (#1) 12g-2 in response to various commands received by the disk control device 16-2 through the interface (I/F) 19.

The three vibration detecting sensors 15 output results of detecting vibrations to at least one of the disk control devices 16-1 and 16-2. When only a vibration in a single direction is noticeable owing to the arrangement of the HDDs, the number of the vibration detecting sensors 15 may be reduced to one. The at least one of the disk control devices 16-1 and 16-2 receives the results of detecting the vibrations and monitors the states of the vibrations by executing the vibration monitoring and control program. The at least one of the disk control devices 16-1 and 16-2 performs the vibration reduction control to control and reduce the vibrations when necessary. A plurality of storage devices 10 are combined to form a storage system.

Figure 3:
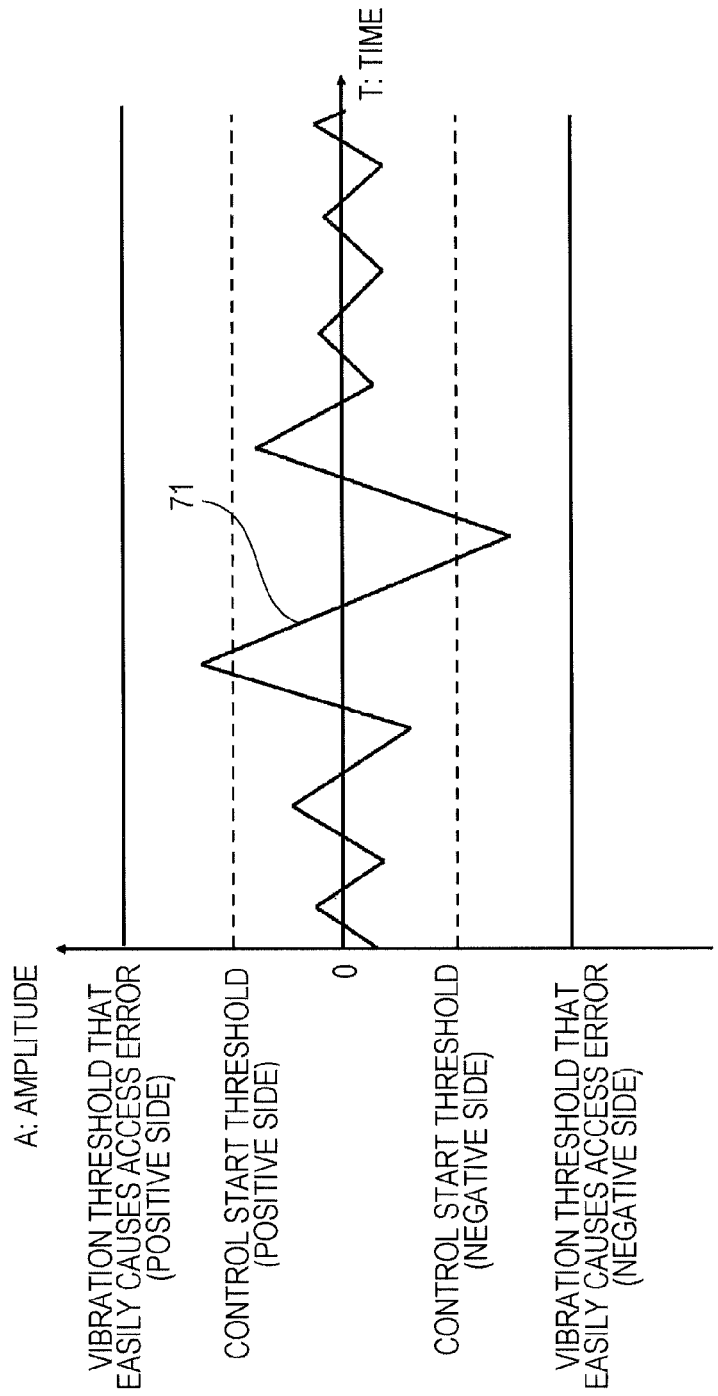
FIG. 3 illustrates the state of a vibration that occurs in the storage device.

FIG. 3 illustrates the state of a vibration that occurs in the storage device 10. In FIG. 3, the ordinate indicates an amplitude A of the vibration, and the abscissa indicates a time T. In FIG. 3, when a vibration does not occur, the amplitude A is 0. As illustrated in FIG. 3, a vibration that is detected by each of the vibration detecting sensors 15 located at the three positions varies over time. When the vibration is transferred so that a resonance occurs between drives 12 included in the storage device 10 or between storage devices 10 included in the storage system, the amplitude of the vibration rapidly increases. At least one of the CPUs (processors) 16a and 16c may calculate a frequency of the vibration on the basis of a waveform of the vibration.

When the storage device 10 continuously operates in the aforementioned state, the heads that are included in the HDDs are highly likely to vibrate, and an access error such as an error of reading data or an error of writing data is highly likely to occur. Thus, a control start threshold that causes the vibration reduction control to start to be performed is set to a value that is sufficiently lower than a vibration threshold that easily causes an access error. For example, the control start threshold is set to 50% of the vibration threshold. Thus, before a vibration that easily causes an access error occurs, the vibration reduction control may start to be controlled so that it is possible to inhibit the amplitude of the vibration from increasing.

Figure 4:
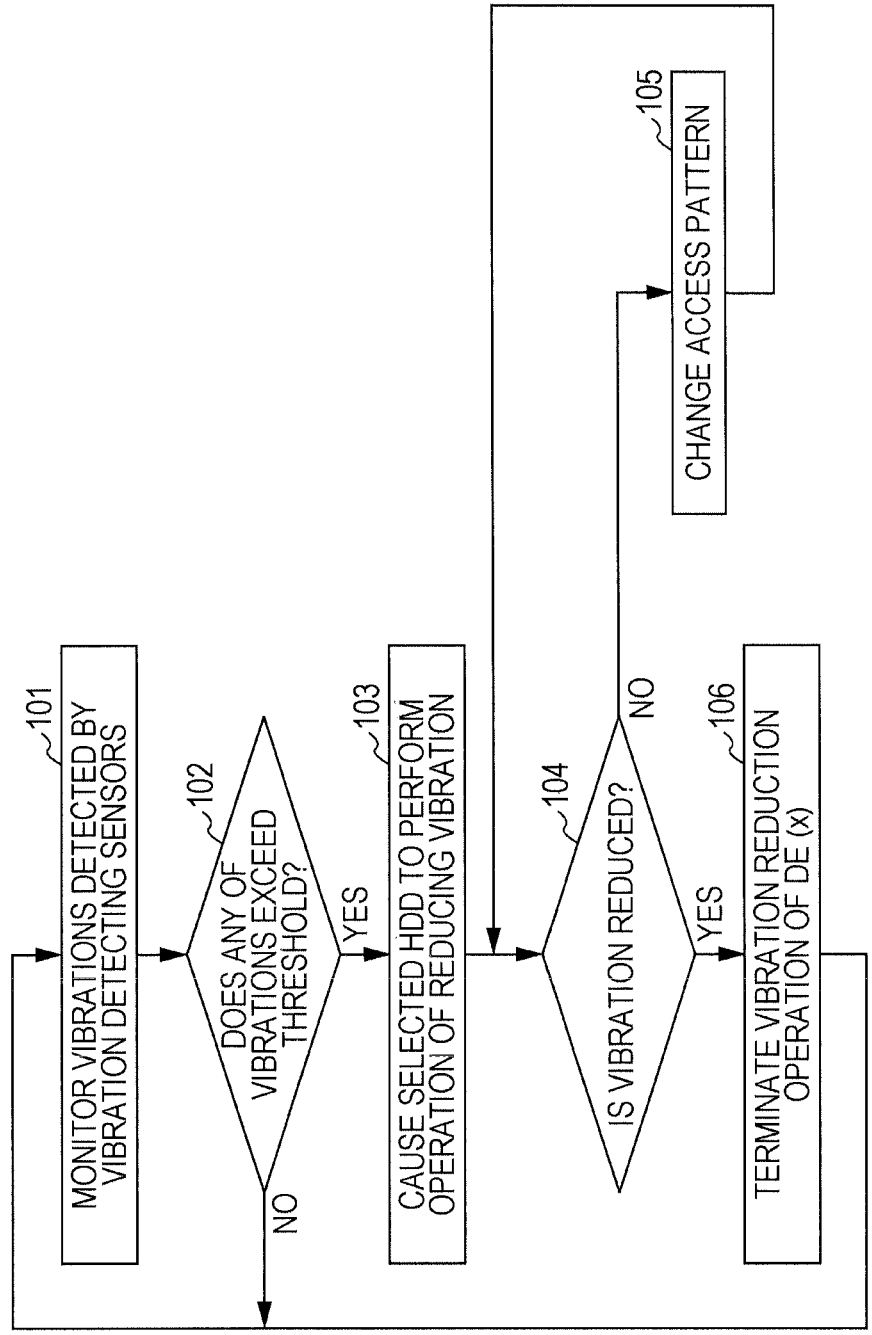
FIG. 4 illustrates a method of vibration reduction control according to a first embodiment.

FIG. 4 illustrates a method of the vibration reduction control according to a first embodiment. At least one of the CPUs 16a and 16c executes the control method illustrated in FIG. 4. The vibration detecting sensors 15 detect vibrations of the storage device 10 and output results of detecting the vibrations to at least one of the disk control devices 16-1 and 16-2. The at least one of the disk control devices 16-1 and 16-2 receives the results output from the vibration detecting sensors 15 and monitors the states of the vibrations at regular time intervals (in operation 101).

When the amplitudes of the vibrations do not exceed the control start threshold (No in operation 102), the at least one of the disk control devices 16-1 and 16-2 continuously monitors the states of the vibrations. When at least one of the amplitudes of the vibrations detected by the vibration detecting sensors 15 exceeds the control start threshold (Yes in operation 102), the at least one of the disk control devices 16-1 and 16-2 starts to perform the vibration reduction control.

Then, the at least one of the disk control devices 16-1 and 16-2 selects, from among the plurality of HDDs, an HDD for which a process is yet to be performed in accordance with a command and the command stands by and in which heads do not currently access (or there is no access). For example, when the storage device 10 has a spare drive (spare HDD) 12s set therein, the at least one of the disk control devices 16-1 and 16-2 selects the spare HDD 12s. The spare HDD 12s is a drive that is used as an alternative of an HDD if the HDD fails. Then, the at least one of the disk control devices 16-1 and 16-2 causes the spare HDD (HDD to be instructed) 12s to perform an operation of reducing the vibration (in operation 103).

Thus, the storage device 10 may perform the operation of reducing the vibration using a spare HDD or an HDD for which a command stands by without stopping an operation of an HDD in which a process is currently performed in accordance with a command.

When the at least one of the disk control devices 16-1 and 16-2 reduces the value of the vibration detected by at least one of the vibration detecting sensors 15 of the storage device 10 and confirms the reduction in the value of the vibration (Yes in operation 104), the at least one of the disk control devices 16-1 and 16-2 determines that a risk of an access error is reduced, and the at least one of the disk control devices 16-1 and 16-2 terminates the operation of reducing the vibration (in operation 106). Then, the process returns to operation 101, and the at least one of the disk control devices 16-1 and 16-2 monitors the states of the vibrations at the regular time intervals (in operation 101).

When the amplitude of the vibration is not reduced (No in operation 104), the at least one of the disk control devices 16-1 and 16-2 changes an access pattern for the operation of reducing the vibration and continuously performs the operation of reducing the vibration until the at least one of the disk control devices 16-1 and 16-2 confirms a reduction in the amplitude of the vibration (in operation 105). The operation of reducing the vibration is described in detail later.

The storage device 10 starts to perform the vibration reduction control before a vibration that easily causes an access error occurs, and the storage device 10 inhibits a vibration from being transferred to the other drives 12 included in the storage device 10.

Figure 5:
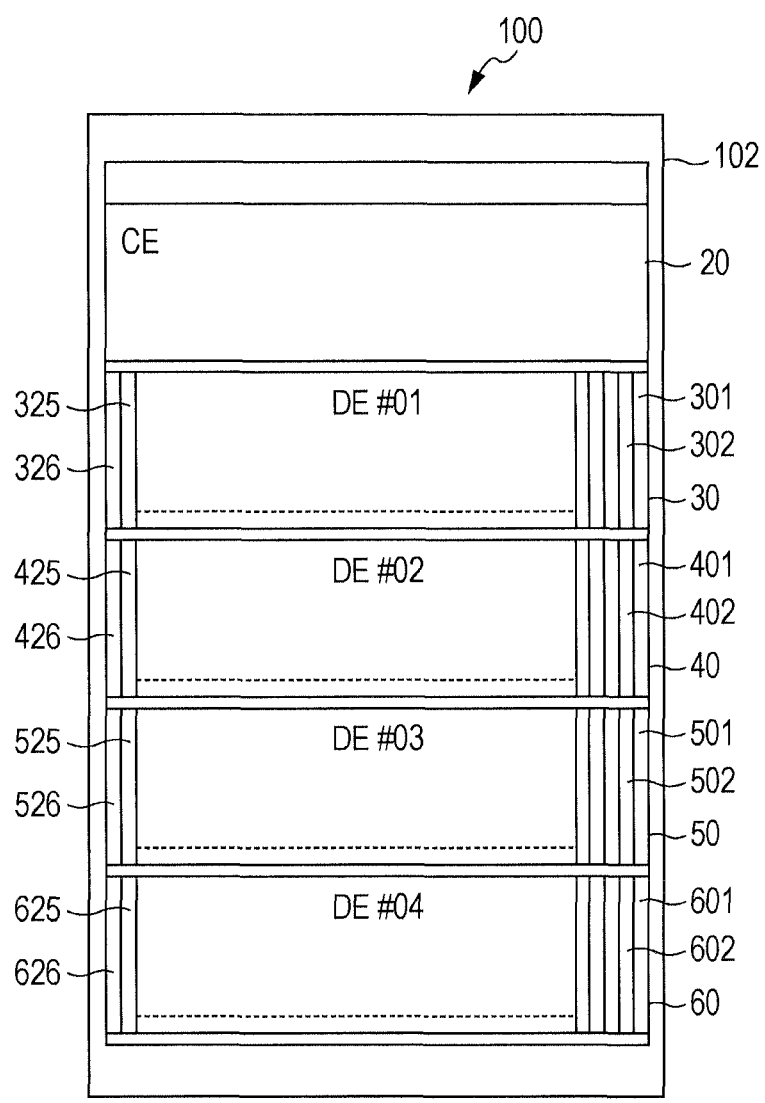
FIG. 5 illustrates an example of the configuration of a storage system.

FIG. 5 illustrates the configuration of the storage system. The present embodiment describes a storage system that includes four storage devices and one storage control device as an example. A storage system 100 includes a chassis 102 that has a plurality of storage shelves. A storage control device 20 and a plurality of storage devices (DEs #01 to #04) 30, 40, 50 and 60 are located on the storage shelves of the chassis 102. The storage control device (control enclosure (CE) 20 that is located on a first storage shelf of the chassis 102 controls the entire storage system 100.

The storage device (DE#01) 30 that is located on a second storage shelf of the chassis 102 has disk drives 301 to 326 that each include a plurality of HDDs. The storage device (DE#02) 40 that is located on a third storage shelf of the chassis 102 has disk drives 401 to 426 that each include a plurality of HDDs. The storage device (DE#03) 50 that is located on a fourth storage shelf of the chassis 102 has disk drives 501 to 526 that each include a plurality of HDDs. The storage device (DE#04) 60 that is located on a fifth storage shelf of the chassis 102 has disk drives 601 to 626 that each include a plurality of solid state drives (SSDs) instead of a plurality of HDDs.

The SSDs each include a semiconductor memory (such as a flash memory) as a storage medium instead of a platter. Thus, the SSDs do not include mechanism parts such as a motor and a head arm and do not cause a vibration, unlike the HDDs. The storage devices 30, 40, 50 and 60 each have the same configuration of the storage device 10 illustrated in FIGS. 1A and 1B, and an illustration and description thereof are omitted.

Figure 6:
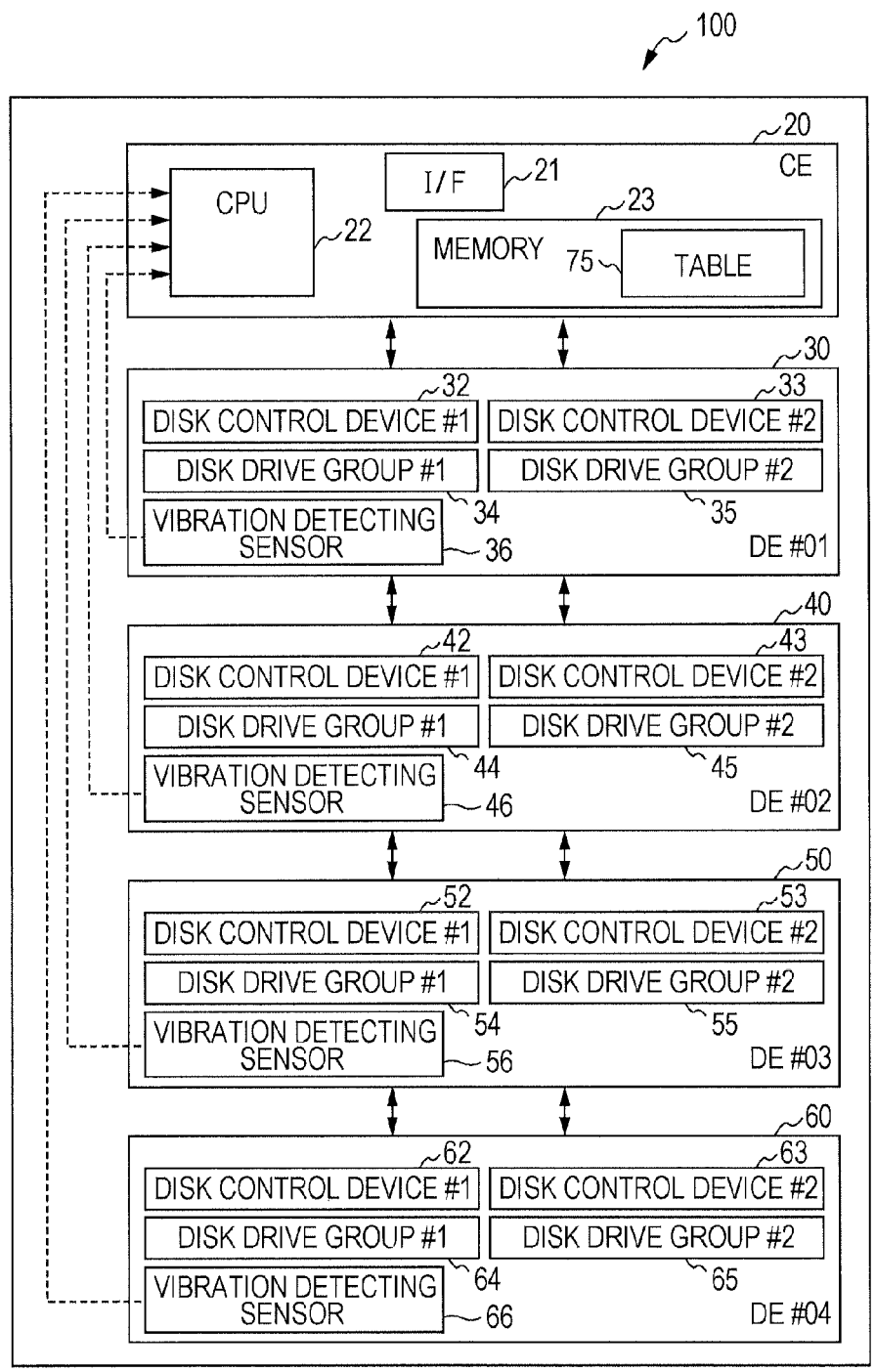
FIG. 6 illustrates an example of the storage system.

FIG. 6 illustrates the storage system 100. The storage control device 20 that is included in the storage system 100 includes a processor (CPU) 22, a memory (RAM) 23 and an interface 21. The processor (CPU) 22 controls the entire storage system 100. The interface 21 includes a channel interface and a disk interface. The channel interface is connected to a host system (not illustrated) such as an external server. The disk interface is connected to the storage devices 30, 40, 50 and 60.

The CPU 22 of the storage control device 20 receives a command from the host system, issues a write command to cause each of the storage devices 30, 40, 50 and 60 to write data, and issues a read command to cause each of the storage devices 30, 40, 50 and 60 to read data.

In addition, the CPU 22 executes the vibration monitoring and control program, monitors operational states of the storage devices 30, 40, 50 and 60 and functions as a vibration monitoring and control module that performs the vibration reduction control.

The memory 23 stores the vibration monitoring and control program (to be executed by the CPU 22) and various programs. In addition, the memory 23 stores, in an operational state management table 75, collected access statuses of the storage devices 30, 40, 50 and 60 and collected states of vibrations of the storage devices 30, 40, 50 and 60. The operational state management table 75 is described in detail later.

The storage device 30 includes a disk control device (#1) 32, a disk control device (#2) 33, a disk drive group (#1) 34 including a plurality of HDDs and a disk drive group (#2) 35 including a plurality of HDDs. The storage device 40 includes a disk control device (#1) 42, a disk control device (#2) 43, a disk drive group (#1) 44 including a plurality of HDDs and a disk drive group (#2) 45 including a plurality of HDDs. The storage device 50 includes a disk control device (#1) 52, a disk control device (#2) 53, a disk drive group (#1) 54 including a plurality of HDDs and a disk drive group (#2) 55 including a plurality of HDDs. Two power supply devices, various circuits and the like are included in each of the storage devices 30, 40, 50 and 60, although the power supply devices, the various circuits and the like are not illustrated in FIG. 6.

The disk control device (#1) 32 controls the plurality of HDDs included in the disk drive group (#1) 34. The disk control device (#1) 42 controls the plurality of HDDs included in the disk drive group (#1) 44. The disk control device (#1) 52 controls the plurality of HDDs included in the disk drive group (#1) 54. The disk control device (#2) 33 controls the plurality of HDDs included in the disk drive group (#2) 35. The disk control device (#2) 43 controls the plurality of HDDs included in the disk drive group (#2) 45. The disk control device (#2) 53 controls the plurality of HDDs included in the disk drive group (#2) 55. SSDs may be installed in a part of slots of each of the disk drive groups (#1) 34, 44, 54 and (#2) 35, 45, 55 of the storage devices 30, 40 and 50 instead of HDDs.

Only the SSDs are installed in all slots of the storage device 60. The storage device 60 includes a disk drive group (#1) 64 including a plurality of SSDs and a disk drive group (#2) 65 including a plurality of SSDs. A disk control device (#1) 62 controls the plurality of SSDs included in the disk drive group (#1) 64. A disk control device (#2) 63 controls the plurality of SSDs included in the disk drive group (#2) 65.

The storage device 30 includes a vibration detecting sensor 36 located on an upper surface of the chassis of the storage device 30, a vibration detecting sensor 36 located on a left side surface of the chassis of the storage device 30 and a vibration detecting sensor 36 located on a right side surface of the chassis of the storage device 30. The vibration detecting sensors 36 each detect a vibration of the storage device 30. The storage device 40 includes a vibration detecting sensor 46 located on an upper surface of the chassis of the storage device 40, a vibration detecting sensor 46 located on a left side surface of the chassis of the storage device 40 and a vibration detecting sensor 46 located on a right, side surface of the chassis of the storage device 40. The vibration detecting sensors 46 each detect a vibration of the storage device 40. The storage device 50 includes a vibration detecting sensor 56 located on an upper surface of the chassis of the storage device 50, a vibration detecting sensor 56 located on a left side surface of the chassis of the storage device 50 and a vibration detecting sensor 56 located on a right side surface of the chassis of the storage device 50. The vibration detecting sensors 56 each detect a vibration of the storage device 50. The storage device 60 includes a vibration detecting sensor 66 located on an upper surface of the chassis of the storage device 60, a vibration detecting sensor 66 located on a left side surface of the chassis of the storage device 60 and a vibration detecting sensor 66 located on a right side surface of the chassis of the storage device 60. The vibration detecting sensors 66 each detect a vibration of the storage device 60.

As the vibration detecting sensors 36, 46, 56 and 66, acceleration sensors may be used. As each of the acceleration sensors, a single-axis sensor that detects a vibration in a vertical direction in which the storage control device 20 and the storage devices 30, 40, 50 and 60 are stacked may be used. In addition, as each of the acceleration sensors, a three-axis sensor that detects vibrations in x, y and z directions may be used. In the present embodiment, since the storage control device 20 and the storage devices 30, 40, 50 and 60 are stacked in the vertical direction, the single-axis sensors that detect vibrations in the vertical direction may be used. When the storage control device 20 and the storage devices 30, 40, 50 and 60 are arranged in a horizontal direction, single-axis sensors that detect vibrations in the horizontal direction may be used.

All the disk drives that are included in the storage device 60 are the SSDs. Thus, the storage device 60 does not cause a vibration. When at least one of the drives included in the storage device 60 is replaced with an HDD by an operator, the storage device 60 may cause a vibration. Thus, the storage device 60 includes the vibration detecting sensors 66.

The vibration detecting sensors 36, 46, 56 and 66 transmit, to the CPU 22 of the storage control device 20, results that indicate vibrations detected by the vibration detecting sensors 36, 46, 56 and 66. Thus, the CPU 22 of the storage control device 20 executes the vibration monitoring and control program, collects states of the vibrations of the storage devices 30, 40, 50 and 60, monitors the vibrations of the storage devices 30, 40, 50 and 60 and performs the vibration reduction control when necessary.

The control start threshold that causes the vibration reduction control to start to be performed is set to a value that is sufficiently lower than the vibration threshold that easily causes an access error. For example, the control start threshold is set to 50% of the vibration threshold. Thus, before a vibration that easily causes an access error occurs, the CPU 22 of the storage device 20 may start to perform the vibration reduction control and inhibit the amplitude of a vibration from increasing.

Figure 7:
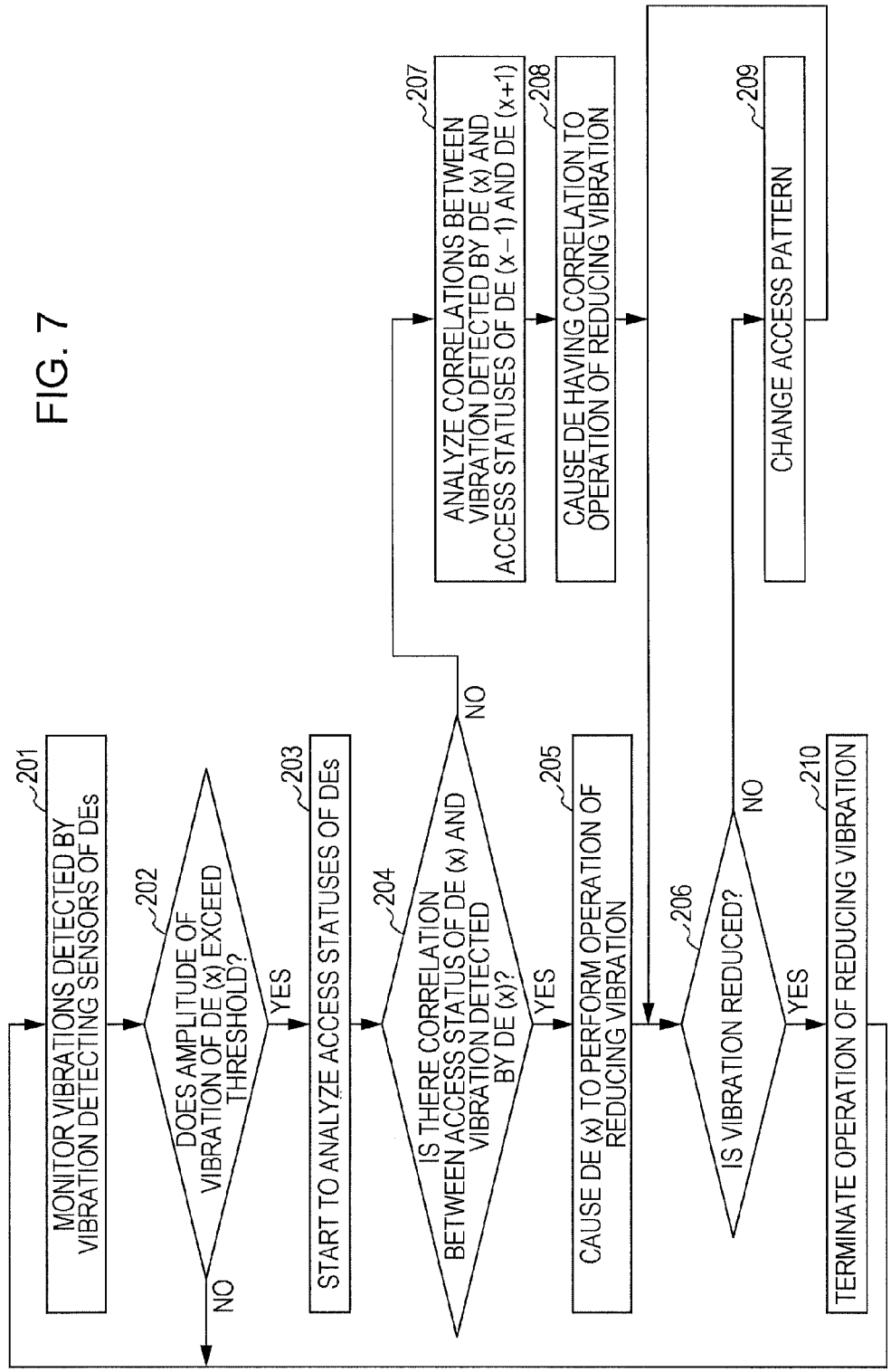
FIG. 7 illustrates a method of vibration reduction control according to a second embodiment.

FIG. 7 illustrates a method of vibration reduction control according to a second embodiment. The method (illustrated in FIG. 7) is performed by the CPU 22. The vibration detecting sensors 36, 46, 56 and 66 detect vibrations of the storage devices (DEs #01 to #04) 30, 40, 50 and 60, respectively, and output results of detecting the vibrations to the storage control device 20.

The CPU 22 of the storage control device 20 receives the results output from the vibration detecting sensors 36, 46, 56 and 66 and monitors the states of the vibrations at regular time intervals (in operation 201). The CPU 22 causes access statuses of the DEs #01 to #04 and the states of the vibrations to be registered in the operational state management table 75. The memory 23 of the storage control device 20 has the operational state management table 75 stored therein.

When the amplitudes of the vibrations do not exceed the control start threshold (No in operation 202), the CPU 22 of the storage control device 20 continuously monitors the states of the vibrations. When the amplitude of a vibration detected by a DE (x) among the DEs #01 to #04 exceeds the control start threshold (Yes in operation 202), the CPU 22 of the storage control device 20 starts to perform the vibration reduction control.

The CPU 22 references the operational state management table 75 for the DEs #01 to #04. Then, the CPU 22 starts to analyze access statuses of the DEs #01 to #04 (in operation 203). The CPU 22 determines whether or not there is a correlation between the access status of the DE (x) and the vibration detected by the DE (x) (in operation 204).

When the CPU 22 determines that there is the correlation between the access status of the DE (x) and the vibration detected by the DE (x) (Yes in operation 204), the CPU 22 causes the DE (x) to perform the operation of reducing the vibration. The CPU 22 selects, from among HDDs installed in the DE (x), an HDD for which a process is not performed in accordance with a command and the command stands by and in which heads do not currently access (or there is no access).

For example, if the DE (x) has a spare disk drive (spare HDD) set therein, the CPU 22 instructs the disk control device 32 or 33 to select the spare HDD. Then, the disk control device 32 or 33 selects the spare HDD. The CPU 22 causes the selected spare HDD (HDD to be instructed) to perform the operation of reducing the vibration of the DE (x) (in operation 205). Therefore, the CPU 22 may cause the spare HDD or an HDD (for which a command stands by) to perform the operation of reducing a vibration of the HDD without stopping an operation of an HDD in which a process is being performed in accordance with a command.

When the CPU 22 determines that there is no correlation between the access status of the DE (x) and the vibration detected by the DE (x) (No in operation 204), the CPU 22 references the operational state management table 75 and analyzes correlations between the vibration of the DE M and access statuses of DEs (x−1) and (x+1) located adjacent to the DE (x) (in operation 207).

Then, the CPU 22 instructs a DE having a correlation (between the vibration of the DE (x) and the access status of the instructed DE located adjacent to the DE (x)) to cause a spare HDD included in the instructed DE to perform the operation of reducing the vibration (in operation 208). When all disk drives that are included in at least one of the DEs (x−1) and (x+1) are SSDs, the CPU 22 does not instruct the at least one of the DEs (x−1) and (x+1) to perform the operation of reducing the vibration.

When the CPU 22 confirms that the DE (x) performs the operation of reducing the vibration detected by any of the vibration detecting sensors of the DE (x) and that the amplitude of the vibration is reduced (Yes in operation 206), the CPU 22 determines that a risk of an access error is reduced, and the CPU 22 causes the DE (x) to terminate the operation of reducing the vibration (in operation 210).

Then, the process returns to operation 201, and the CPU 22 monitors the states of the vibrations at the regular time intervals.

When the CPU 22 confirms that the amplitude of the vibration is not reduced (No in operation 206), the CPU 22 causes the spare disk drive included in the instructed DE to change an access pattern for the operation of reducing the vibration and continuously perform the operation of reducing the vibration until the CPU confirms that the amplitude of the vibration is reduced (in operation 209). The operation of reducing the vibration is described in detail later.

Figure 9A:
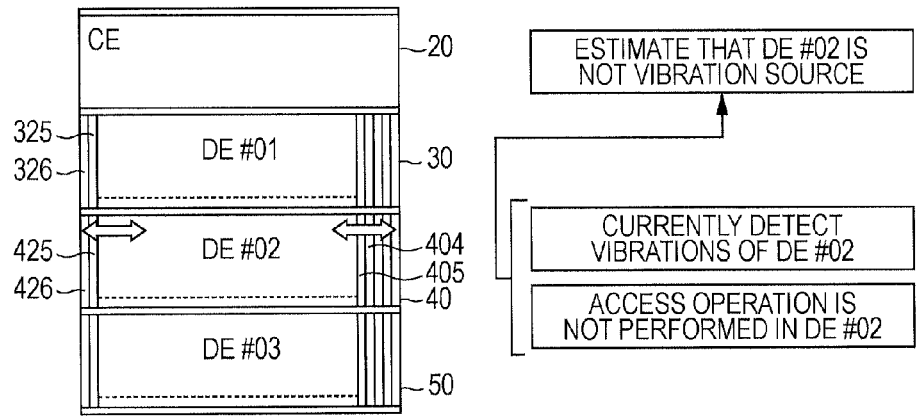
FIGS. 9A to 9C illustrate a first example of a method for estimating a vibration source.
Figure 9B:
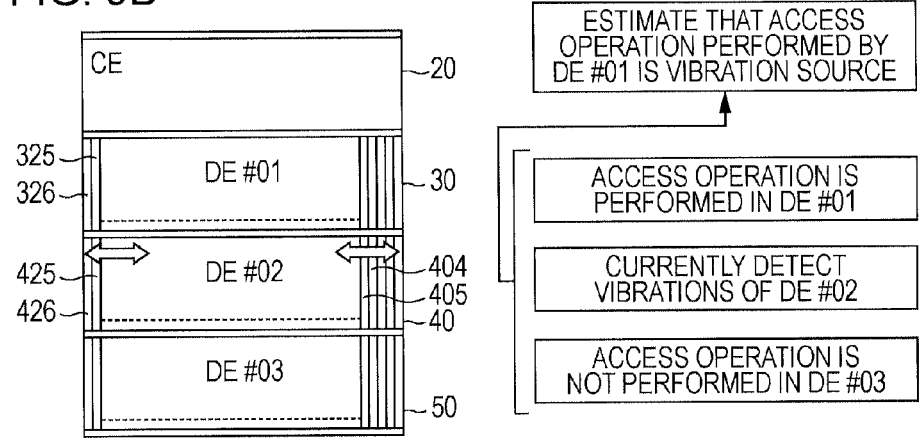
Figure 9C:
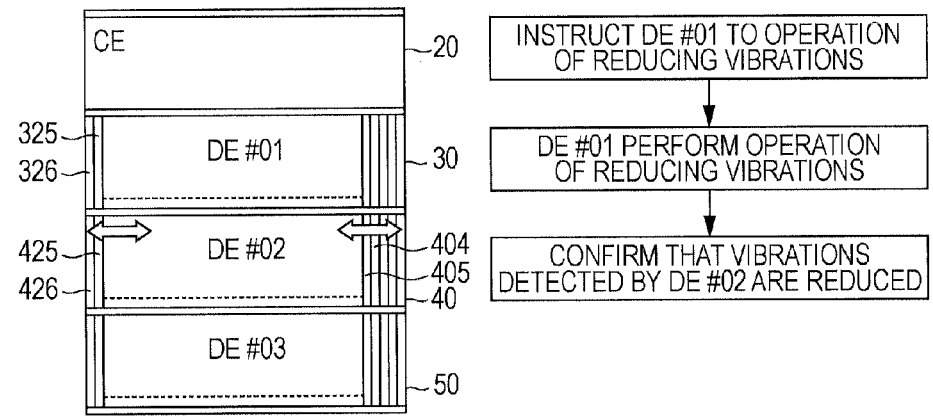

FIG. 8 illustrates the operational state management table 75 for the storage devices. FIGS. 9A to 9C illustrate a first example of a method for estimating a vibration source. The access statuses of the DEs #01 to #03 and the states of vibrations of the DEs #01 to #03 are registered in the operational state management table 75. In the present embodiment, since all the disk drives that are included in the DE #04 are the SSDs, the DE #04 is not a DE to be monitored.

The operational state management table 75 that is illustrated in FIG. 8 indicate times in a first row and accesses statuses and the states of vibrations in a second row and later. Values of vibrations that are detected by the vibration detecting sensors located on the upper, left side and right side surfaces of the chassis of the DE #02 are equal to or higher than 0.5 at times of 0:10:15 and 0:10:20.

Since the values of the vibrations that occur in the DE #02 are equal to or higher than 0.5 (50% of the vibration threshold that easily causes an access error), the CPU 22 starts to perform the vibration reduction control to control and reduce the vibrations. The CPU 22 determines whether or not there is a correlation between the access status of the DE #02 and the vibrations detected by the DE #02. When the values of the vibrations detected by the DE #02 are equal to or higher than 0.5, the access status of the DE #02 indicates "no access".

As illustrated in FIG. 9A, an access operation is not performed in the DE #02 that currently detects a vibration whose value exceeds the control start threshold. Thus, the CPU 22 determines that there is no correlation between the access status of the DE #02 and the vibrations detected by the DE #02, and whereby the CPU 22 estimates that the DE #02 is not a source of the vibrations. As illustrated in FIG. 9B, the CPU 22 analyzes correlations between the access statuses of the DEs #01 and #03 located adjacent to the DE #02 in the vertical direction and the vibrations detected by the DE #02.

The DE #01 performs an access operation in a disk drive installed in a slot 7 in accordance with a read command at the times of 0:10:15 and 0:10:20. Since the DE #03 does not perform an access operation at the times of 0:10:15 and 0:10:20, the CPU 22 determines that there is no correlation between the access status of the DE #03 and the vibrations detected by the DE #02. Thus, the CPU 22 determines that the DE #03 is not the source of the vibrations. Therefore, the CPU 22 determines that the DE #01 that performs the access operation at the times of 0:10:15 and 0:10:20 is the source of the vibrations.

As illustrated in FIG. 9C, the CPU 22 instructs the DE #01 to perform the operation of reducing the vibrations. At least one of the disk control devices 32 and 33 of the DE #01 causes at least one of the spare disk drives 325 and 326 to the operation of reducing the vibrations.

When the CPU 22 causes the DE #01 to perform the operation of reducing the vibrations, and the vibrations are not reduced, the CPU 22 changes an access pattern for the operation of reducing the vibrations and causes the DE #01 to continuously perform the operation of reducing the vibrations until the CPU 22 confirms that the vibrations are reduced. After that, when the values of the vibrations detected by the DE #02 are reduced, and the CPU 22 confirms that the values of the vibrations are reduced, the CPU 22 determines that a risk of an access error is reduced, and the CPU 22 causes the DE #01 to terminate the operation of reducing the vibrations.

When the DE #01 performs the operation of reducing the vibrations, and the vibrations are not reduced, the CPU 22 may cause the DE #02 causing the vibrations to perform the operation of reducing the vibrations. In this case, at least one of the disk control devices 42 and 43 of the DE #02 causes at least one of the spare disk drives 425 and 426 to perform the operation of reducing the vibrations.

Figure 10A:
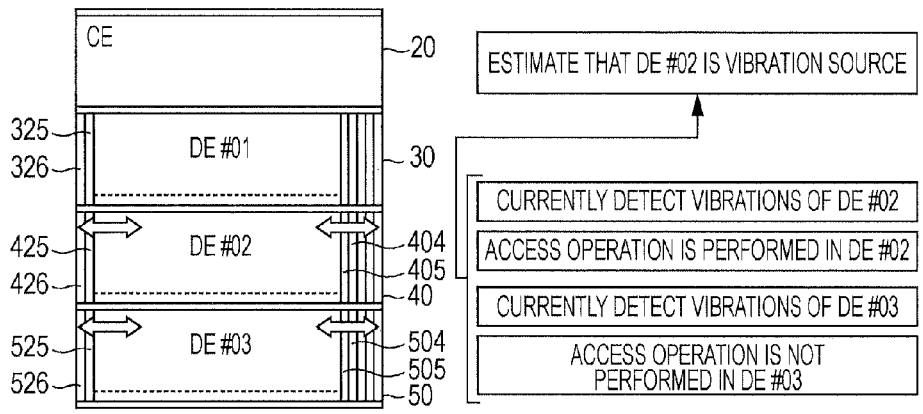
FIGS. 10A to 10C illustrate a second example of the method for estimating a vibration source.
Figure 10B:
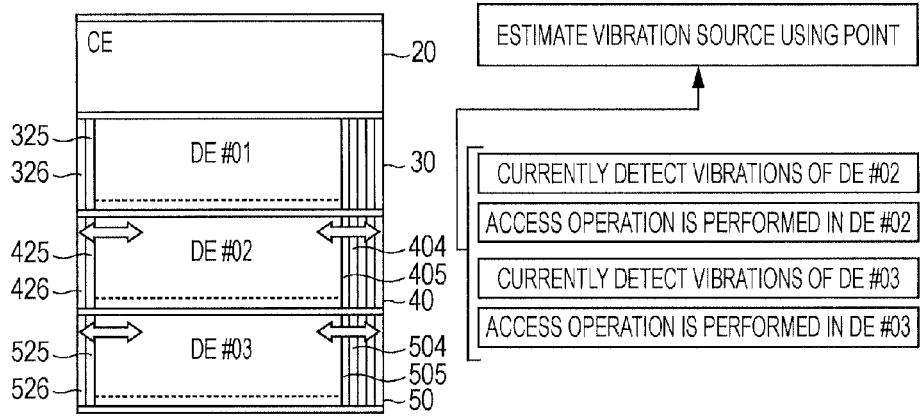
Figure 10C:
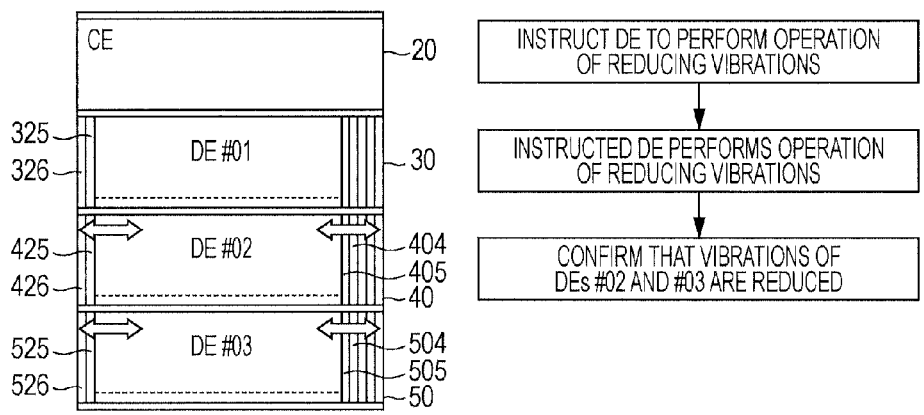

FIGS. 10A to 10C illustrate a second example of the method for estimating a vibration source. FIGS. 9A to 9C illustrate the example in which the single DE detects the vibrations whose values exceed the control start threshold. FIGS. 10A to 10C illustrate the example in which a plurality of DEs detect vibrations whose values exceed the control start threshold.

As illustrated in FIG. 10A, the vibration detecting sensors 36 and 46 of the DEs #02 and #03 detect vibrations whose values exceed the control start threshold. The CPU 22 references the operational state management table 75 and determines the access statuses of the DEs #02 and #03. When the CPU 22 determines that an access operation is performed in the DE #02 and an access operation is not performed in the DE #03, the CPU 22 estimates that the DE #02 is a source of the vibrations. Then, the CPU 22 determines that the DE #02 is a DE to be instructed, and the CPU 22 instructs the DE #02 to perform the operation of reducing the vibrations, as illustrated in FIG. 10C.

As illustrated in FIG. 10B, the vibration detecting sensors 36 and 46 of the DEs #02 and #03 detect the vibrations whose values exceed the control start threshold. The CPU 22 references the operational state management table 75 and determines the access statuses of the DEs #02 and #03. When the CPU 22 determines that an access operation is performed in each of the DEs #02 and #03, the CPU 22 estimates a source of the vibrations using a point.

The CPU 22 uses a point to estimate a DE that causes the largest vibration, and the CPU 22 instructs the estimated DE (to be instructed) to perform the operation of reducing the vibrations. Then, the CPU 22 determines, on the basis of a calculation (described later) using a point, that the DE #02 is the DE to be instructed, and the CPU 22 instructs the DE #02 to perform the operation of reducing the vibrations, as illustrated in FIG. 10C.

In this manner, the CPU 22 estimates the DE that is the source of the vibrations, and the CPU 22 causes the estimated DE (to be instructed) to perform the operation of reducing the vibrations. When the DE performs the operation of reducing the vibrations, and the vibrations are not reduced, the CPU 22 changes an access pattern for the operation of reducing the vibrations and causes the DE (to be instructed) to continuously perform the operation of reducing the vibrations until the CPU 22 confirms that the vibrations are reduced.

After that, when the vibrations of the DEs #02 and #03 are reduced, and the CPU 22 confirms that the vibrations of the DEs #02 and #03 are reduced, the CPU 22 determines that a risk of an access error is reduced, and the CPU 22 causes the DE (to be instructed) to terminate the operation of reducing the vibrations.

Figure 11A:
FIGS. 11A and 11B illustrate a method for estimating a vibration source using a point.
Figure 11B:

FIGS. 11A and 11B illustrate a method for estimating a vibration source using a point. When a plurality of DEs detect vibrations whose values exceed the control start threshold, and the CPU 22 confirms that an access operation is performed in each of the plurality of DEs, the CPU 22 estimates a source of the vibrations using the types of the disk drives installed in the DEs #01 to #04 and the number of times of access.

There are HDDs that include platters whose numbers of revolutions are different. For example, there are an HDD that includes platters whose numbers of revolutions are 15000 rpm, an HDD that includes platters whose numbers of revolutions are 10000 rpm and an HDD that includes platters whose numbers of revolutions are 7200 rpm. In addition, the SSDs that each include a semiconductor memory such as a flash memory do not include mechanical parts such as a head arm and a rotating mechanism for rotating a platter. A point system that provides a point on the basis of the type of a drive is introduced. In the point system, an HDD that includes platters whose numbers of revolutions are large is treated as an HDD that largely affects a vibration.

A table 81 that is illustrated in FIG. 11A indicates points that are provided for the types of HDDs. It is assumed that when the numbers of revolutions of platters of an HDD are 15000 rpm, 1 point is provided; when the numbers of revolutions of platters of an HDD are 10000 rpm, 0.7 points are provided; and when the numbers of revolutions of platters of an HDD are 7200 rpm, 0.5 points are provided. In addition, it is assumed that a point is not provided to each of the SSDs. This is due to the fact that the SSDs do not include the aforementioned mechanism parts and cause a vibration. The points may be changed depending on specifications of the HDDs and the states of vibrations of the HDDs.

As illustrated in FIG. 10B, when the CPU 22 confirms that an access operation is performed in each of the DEs #02 and #03, the CPU 22 references the operational state management table 75 and confirms the access statuses of the DEs #02 and #03. For example, it is assumed that access to five drives is performed in the DE #02 and access to three drives is performed in the DE #03. The CPU 22 verifies the number of times of access performed in each of the DEs #02 and #03 and the types of the drives of the DEs #02 and #03 and calculates the total of points of each of the DEs #02 and #03.

A table 82 that is illustrated in FIG. 11B indicates the total of the points of each of the DEs #02 and #03. The table 82 indicates that access to two HDDs of 7200 rpm and three SSDs is performed in the DE #02 and access to three HDDs of 15000 rpm is performed in the DE #03. Thus, the total of the points of the DE #02 is 5, and the total of the points of the DE #03 is 3.

Thus, the CPU 22 estimates that the DE #02 is a vibration source that causes the largest vibration. Then, the CPU 22 treats the DE #02 as the DE to be instructed and causes the DE #02 to perform the operation of reducing the vibrations as illustrated in FIG. 10C. In this manner, the storage control device 20 may easily estimate the storage device (DE) to be instructed to perform the operation of reducing the vibrations. In addition, the storage control device 20 causes the storage device (that is the vibration source) to perform the operation of reducing the vibrations and thereby efficiently reduce the vibrations.

FIG. 12 is a diagram illustrating a method for reducing a vibration. As illustrated in FIG. 12, the amplitude of a vibration that is generated in the operation of reducing a vibration is sufficiently smaller than the amplitude of the vibration that has a waveform 71 and is detected by any of the vibration detecting sensors, and a cycle of the vibration that is generated in the operation of reducing the vibration is sufficiently shorter than a cycle of the vibration detected by the vibration detecting sensor. The vibration that is generated in the operation of reducing the vibration has a waveform 92.

The amplitude of the vibration that has the waveform 92 is in a range of one-tenth of the amplitude of the vibration having the waveform 71 to one-fourth of the amplitude of the vibration having the waveform 71. The frequency of the vibration that has the waveform 92 is in a range of 4 times of the frequency of the vibration having the waveform 71 to 10 times of the frequency of the vibration having the waveform 71. The waveform 71 of the vibration is combined with the waveform 92 of the vibration so as to form a waveform 93 of a vibration.

Thus, when the amplitude of the vibration that has the waveform 71 is set to a range of a negative control start threshold to a positive control start threshold, the amplitude of the vibration may be sufficiently smaller than the vibration threshold that easily causes an access error. Therefore, the storage system 100 may inhibit an access error from occurring in the HDDs.

In addition, as an example of a method for generating the waveform 92 of the vibration in an HDD to be instructed, driving of a head arm of the HDD to be instructed is controlled. The storage control device 20 or at least one of the disk control devices issues a predetermined command to the HDD to be instructed and thereby causes the HDD (to be instructed) to drive the head arm.

As the predetermined command, a read command to instruct the HDD (to be instructed) to read dummy data stored in an interested platter may be used. In addition, as the predetermined command, a seek command to instruct the HDD (to be instructed) to perform a seek operation or move the head arm from the inner side of the platter to the outer side of the platter may be used.

When the dummy data is to be used, the dummy data is stored in several regions of the platter for the operation of reducing a vibration. Addresses (logical block addresses (LBAs)) of the platter that has the dummy data stored therein are stored in the memory 23 in advance. Then, the storage control device or at least one of the disk control devices issues, to the HDD (to be instructed), a command that specifies the addresses. Instead of the command, another command that supports specifications of the storage device or specifications of the storage system may be used, or a read command to instruct the HDD (to be instructed) to read stored data may be used.

FIG. 13 is a diagram illustrating a method for changing an access pattern. An access pattern for the operation of reducing the vibration is changed by controlling an operation of driving the head arm of the HDD. As indicated by a table 96 illustrated in FIG. 13, when the amplitude of a detected vibration exceeds the control start threshold, the head arm repeatedly moves in short cycles that are each equal to one-fourth of the original cycle of a full seek operation, and whereby the HDD tries to perform the operation of reducing the vibration.

When the head arm repeatedly moves in the short cycles and the vibration is not reduced, the head arm repeatedly moves in medium cycles that are each equal to a half of the original cycle of the full seek operation. When the head arm repeatedly moves in the medium cycles and the vibration is not reduced, the head arm repeatedly moves in long cycles that are each equal to the original cycle of the full seek operation. The storage control device 20 or at least one of the disk control devices issues, to the HDD to be instructed, a read command to perform the aforementioned operation or a seek command to perform the aforementioned operation.

The addresses (logical block addresses (LBAs)) of the platter, which are used to position the head, are stored in the memory 23 in advance, and the storage control device 20 or at least one of the disk control devices issues, to the HDD to be instructed, the command that specifies the addresses.

Thus, the storage device according to the present embodiment and the storage system according to the present embodiment may simulate all vibration patterns and actively perform the vibration reduction control without designing a structure of the storage device and a structure of the storage system. Even when an unknown vibration occurs, the storage device according to the present embodiment and the storage system according to the present embodiment may suppress the vibration so that an access error does not occur, and the storage device and the storage system may transfer data in a stable manner.

The invention is not limited to the aforementioned embodiments, the embodiments may be combined without a discrepancy between the embodiments. The aforementioned embodiments are examples. Configurations that are substantially the same as the technical ideas described in the claims, and effects that are the same as or similar to the technical ideas described in the claims, are included in the technical scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device, comprising:
a processor;
a vibration detecting sensor that detects a vibration;
a plurality of disk drives; and
a disk control device that causes the processor to generate, based on the vibration detected, a vibration, at a smaller amplitude than that of the vibration detected, for a disk drive selected from among the plurality of disk drives so that the generated vibration vibrates in a cycle that is shorter than a cycle of the vibration detected by the vibration detecting sensor.

2. The storage device according to claim 1,
wherein the plurality of disk drives includes a spare disk drive that is used instead of a disk drive among the plurality of disk drives when the disk drive fails, and
wherein the disk control device selects the spare disk drive and causes the processor to perform the operation for the selected spare disk drive.

3. The storage device according to claim 1,
wherein the operation of generating the vibration that vibrates in the shorter cycle than the cycle of the vibration detected by the vibration detecting sensor is a read operation to be performed in accordance with a given access pattern or a seek operation to be performed in accordance with the given access pattern.

4. The storage device according to claim 1, comprising:
a chassis accommodating the processor, the plurality of disk drives and the disk control device,
wherein the vibration detecting sensor is deposited on the chassis, and the disk control device selects, from among the plurality of disk drives, a disk drive that is in standby mode when the vibration is detected, and accesses the selected disk drive to generate a vibration of the selected disk drive.

5. A storage system, comprising:
a chassis;
a processor;
a plurality of storage devices that are arranged adjacent to each other in the chassis;
a plurality of disk drives that are included in each of the plurality of storage devices and each position a head above a target position of a rotating storage medium so as to read and write data;
vibration detecting sensors that are included in the plurality of storage devices and detect vibrations that occur in the plurality of storage devices; and
a control device that causes the processor to generate, based on the vibrations detected, a vibration, at a smaller amplitude than that of a vibration detected by the vibration detecting sensors, for a storage device selected from among the plurality of storage devices so that the generated vibration vibrates in a cycle that is shorter than cycles of the vibrations detected by the vibration detecting sensors.

6. The storage system according to claim 5,
wherein a value of the vibration that is detected is evaluated relative to a given threshold, and
when the value of the vibration that is detected by any of the vibration detecting sensors exceeds the given threshold, the control device inspects an operational state of a storage device in which the vibration is detected or an operational state of a storage device having a correlation with the storage device in which the vibration is detected, and the control device selects a storage device to be instructed to perform the operation from among the inspected storage devices.

7. The storage system according to claim 6,
wherein when values of the vibrations that are detected by vibration detecting sensors included in two or more of the storage devices exceed the given threshold, the control device selects a storage device to be instructed to perform the operation from among the two or more of the storage devices based on evaluation of a number of times of access to the disk drives included in the two or more of the storage devices and types of the disk drives included in the two or more of the storage devices.

8. The storage system according to claim 5,
wherein the plurality of disk drives that are included in each of the storage devices include a spare disk drive that is used instead of a disk drive among the plurality of disk drives when the disk drive fails, and
wherein the control device selects a spare disk drive included in a storage device to be instructed to perform the operation and causes the processor to perform the operation for the selected spare disk drive.

9. The storage system according to claim 5,
wherein the operation of generating the vibration that vibrates in the shorter cycle than the cycles of the vibrations detected by the vibration detecting sensors is a read operation to be performed in accordance with a given access pattern or a seek operation to be performed in accordance with the given access pattern.

10. A method of controlling a storage device, the method comprising:
detecting a first vibration cycle generated by at least one disk drive of the storage device; and
generating, by another disk drive selected from the storage device, a second vibration cycle based on the first vibration cycle detected, the second vibration cycle being at a smaller amplitude than that of the first vibration cycle, and being shorter than the first vibration cycle.

* * * * *